(12) United States Patent
Yoshida (10) Patent No.: US 7,277,197 B2
(45) Date of Patent: Oct. 2, 2007

(54) IMAGE COMMUNICATION APPARATUS AND IMAGE COMMUNICATION METHOD

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1032 days.

(21) Appl. No.: 10/347,377

(22) Filed: Jan. 21, 2003

(65) Prior Publication Data

US 2003/0142329 A1 Jul. 31, 2003

(30) Foreign Application Priority Data

Jan. 29, 2002 (JP) .............................. 2002-019407
Dec. 20, 2002 (JP) .............................. 2002-369097

(51) Int. Cl.
*G06F 15/00* (2006.01)

(52) U.S. Cl. ....................... 358/1.9; 358/1.2; 358/1.15; 358/400; 358/500; 709/206; 709/100; 345/418; 345/329; 707/500; 707/526; 382/296; 382/148

(58) Field of Classification Search ................. 358/1.2, 358/1.9, 402, 435, 434, 449, 1.15, 500, 400, 358/407; 382/296, 148; 707/500, 526; 345/418, 345/329; 709/206, 100
See application file for complete search history.

(56) References Cited

U.S. PATENT DOCUMENTS

| | | | | |
|---|---|---|---|---|
| 4,814,894 A | | 3/1989 | Yoshida ....................... 358/298 |
| 5,485,282 A | * | 1/1996 | Takeda ......................... 358/435 |
| 5,847,847 A | * | 12/1998 | Kosaka ......................... 358/508 |
| 6,105,042 A | * | 8/2000 | Aganovic et al. ........... 715/500 |
| 6,278,529 B1 | * | 8/2001 | Akimoto ....................... 358/1.9 |
| 6,744,535 B2 | * | 6/2004 | Chimura et al. ............. 358/407 |
| 7,092,113 B1 | * | 8/2006 | Saito et al. ................. 358/1.15 |
| 7,106,475 B1 | * | 9/2006 | Tajima et al. ................ 358/1.9 |
| 2001/0054075 A1 | * | 12/2001 | Miyanaga .................... 709/206 |
| 2003/0020960 A1 | * | 1/2003 | Tanimoto ..................... 358/402 |

\* cited by examiner

*Primary Examiner*—Aung S. Moe
*Assistant Examiner*—Ashish K. Thomas
(74) *Attorney, Agent, or Firm*—Fitzpatrick, Cella, Harper & Scinto (57) ABSTRACT

In a pre-procedure in an image communication method, a receiver notifies a transmitter as to whether a capability of receiving JPEG-encoded information is provided, whether a capability of receiving full-color information in Lab color space is provided, whether a capability of receiving full-color information in sYCC color space is provided, and whether a capability of receiving non-regular-sized information in sYCC color space is provided. Furthermore, the transmitter notifies the receiver as to designation of transmission of JPEG-encoded data, designation of transmission of full-color information in Lab color space, designation of transmission of full-color information in sYCC color space, and designation of transmission of non-regular-sized information in sYCC color space. An upper limit of information amount of non-regular-sized information in a main scanning direction is determined based on a maximum receivable sheet size and resolution of full-color information in Lab color space.

6 Claims, 9 Drawing Sheets

| FIF | DIS/DTC SIGNAL | DCS SIGNAL |
|---|---|---|
| 15 | CAPABILITY OF RECEIVING DATA AT 8 pel/mm × 7.7 line/mm OR 200 dpi × 200 dpi | DESIGNATION OF TRANSMISSION OF DATA AT 8 pel/mm × 7.7 line/mm OR 200 dpi × 200 dpi |
| 41 | CAPABILITY OF RECEIVING DATA AT 8 pel/mm × 15.4 line/mm | DESIGNATION OF TRANSMISSION OF DATA AT 8 pel/mm × 15.4 line/mm |
| 42 | CAPABILITY OF RECEIVING DATA AT 300 dpi × 300 dpi | DESIGNATION OF TRANSMISSION OF DATA AT 300 dpi × 300 dpi |
| 43 | CAPABILITY OF RECEIVING DATA AT 16 pel/mm × 15.4 line/mm OR 400 dpi × 400 dpi | DESIGNATION OF TRANSMISSION OF DATA AT 16 pel/mm × 15.4 line/mm OR 400 dpi × 400 dpi |
| 68 | CAPABILITY OF RECEIVING JPEG DATA | DESIGNATION OF TRANSMISSION OF JPEG DATA |
| 69 | CAPABILITY OF RECEIVING FULL-COLOR DATA IN Lab COLOR SPACE | DESIGNATION OF TRANSMISSION OF FULL-COLOR DATA IN Lab COLOR SPACE |
| 97 | CAPABILITY OF RECEIVING COLOR/GRAYSCALE DATA AT 300 dpi × 300 dpi OR 400 dpi × 400 dpi | DESIGNATION OF TRANSMISSION OF COLOR/GRAYSCALE DATA AT 300 dpi × 300 dpi OR 400 dpi × 400 dpi |
| 98 | CAPABILITY OF RECEIVING COLOR/GRAYSCALE DATA AT 100 dpi | DESIGNATION OF TRANSMISSION OF COLOR/GRAYSCALE DATA AT 100 dpi |
| 110 | CAPABILITY OF RECEIVING COLOR/GRAYSCALE DATA AT 600 dpi × 600 dpi | DESIGNATION OF TRANSMISSION OF COLOR/GRAYSCALE DATA AT 600 dpi × 600 dpi |
| 111 | CAPABILITY OF RECEIVING COLOR/GRAYSCALE DATA AT 1200 dpi × 1200 dpi | DESIGNATION OF TRANSMISSION OF COLOR/GRAYSCALE DATA AT 1200 dpi × 1200 dpi |
| X | CAPABILITY OF RECEIVING FULL-COLOR DATA IN sYCC COLOR SPACE | DESIGNATION OF TRANSMISSION OF FULL-COLOR DATA IN sYCC COLOR SPACE |
| X+1 | CAPABILITY OF RECEIVING NON-REGULAR-SIZED INFORMATION IN sYCC COLOR SPACE | DESIGNATION OF TRANSMISSION OF NON-REGULAR-SIZED INFORMATION IN sYCC COLOR SPACE |
| Y~Y+15 | MAXIMUM RECEIVABLE NUMBER OF PIXELS IN MAIN SCANNING DIRECTION IN sYCC COLOR SPACE | DON'T CARE |

IMAGE COMMUNICATION APPARATUS AND IMAGE COMMUNICATION METHOD

BACKGROUND OF THE INVENTION

1. Field of the Invention

The present invention relates to image communication apparatuses and image communication methods. More specifically, the present invention relates to an image communication apparatus such as a facsimile apparatus that allows reception of color information and to an image communication method therefor.

2. Description of the Related Art

When color information is transmitted by a conventional facsimile apparatus, full-color information to be transmitted is JPEG (Joint Photographic Experts Group)-encoded as defined in ITU-T Recommendation T.82 and in Lab color space defined in ITU-T Recommendation T.42.

Recently, use of digital still cameras has become common, so that a demand exists for transmission of color images captured by digital still cameras.

Images captured by digital still cameras have different numbers of pixels in a main scanning direction depending on capture modes and camera types.

In conventional communications via facsimiles, the amount of information in the main scanning direction is determined by a sheet size and a resolution. For example, if the sheet size is A4 and the resolution is 200 dpi, the amount of information in the main scanning direction is determined as 1,728 bits. Thus, transmission of an image having an amount of information other than 1,728 bits is not allowed, requiring processing such as adding white information bits to original information.

Furthermore, according to the conventional art, when color information of a non-regular size is transmitted, the maximum amount of information in the main scanning direction is not defined.

Furthermore, although Lab color space has been used for transmission of color facsimile information, for example, color information captured by a digital still camera is in sYCC color space. Also, color information displayed on a personal computer is in sYCC color space.

Thus, when information captured by a digital camera or information displayed on a personal computer is transmitted via facsimile, information in sYCC color space must first be converted into information in RGB color space and then into information in Lab color space before transmission. The conversion operation is very complex, and causes degradation in the quality of the image information.

SUMMARY OF THE INVENTION

Accordingly, an object of the present invention to provide an image communication apparatus and an image communication method in which the problems described above are eliminated.

Another object of the present invention is to provide an image communication apparatus and an image communication method in which information captured by a digital still camera or information displayed on a personal computer can be transmitted via facsimile by a simple operation, and in which an image having any amount of information in a main scanning direction can be transmitted without degradation in the quality of the image.

Another object of the present invention is to provide an image communication apparatus and an image communication method in which a color image that is suitable for the configuration of an apparatus at a receiving end can be transmitted.

The present invention, in one aspect thereof, provides a method of controlling a color-image communication apparatus. The method includes a receiving step of receiving information representing a maximum receivable size and resolution of color information from an apparatus at a receiving end; an obtaining step of obtaining a number of pixels, in a main scanning direction, of image information to be transmitted; a comparing step of comparing a maximum number of pixels in the main scanning direction, determined by the maximum receivable size and resolution received in the receiving step, with the number of pixels in the main scanning direction, obtained in the obtaining step; and a transmission-control step of not transmitting the image information when the number of pixels in the main scanning direction, obtained in the obtaining step, is larger than the maximum number of pixels in the main scanning direction, determined by the maximum receivable size and resolution received in the receiving step, while transmitting the image information when the number of pixels in the main scanning direction, obtained in the obtaining step, is not larger than the maximum number of pixels in the main scanning direction, determined by the maximum receivable size and resolution received in the receiving step.

The present invention, in another aspect thereof, provides a method of controlling a color-image communication apparatus. The method includes a receiving step of receiving information representing a maximum receivable size and resolution of color information from an apparatus at a receiving end; a designating step of designating transmission of non-regular-sized color information; and a determining step of determining an upper limit of transmittable information amount of non-regular-sized color information in a main scanning direction.

The present invention, in another aspect thereof, provides a color-image communication apparatus. The apparatus includes a receiving unit arranged to receive information representing a maximum receivable size and resolution of color information from an apparatus at a receiving end; an obtaining unit arranged to obtain a number of pixels, in a main scanning direction, of image information to be transmitted; a comparing unit arranged to compare a maximum number of pixels in the main scanning direction, determined by the maximum receivable size and resolution received by the receiving unit, with the number of pixels in the main scanning direction, obtained by the obtaining unit; and a transmission-control unit arranged not to transmit the image information when the number of pixels in the main scanning direction, obtained by the obtaining unit, is larger than the maximum number of pixels in the main scanning direction, determined by the maximum receivable size and resolution received by the receiving unit, and arranged to transmit the image information when the number of pixels in the main scanning direction, obtained by the obtaining unit, is not larger than the maximum number of pixels in the main scanning direction, determined by the maximum receivable size and resolution received by the receiving unit.

The present invention, in another aspect thereof, provides a color-image communication apparatus. The apparatus includes a receiving unit arranged to receive information representing a maximum receivable size and resolution of color information from an apparatus at a receiving end; a designating unit arranged to designate transmission of non-regular sized color information; and a determining unit arranged to determine an upper limit of transmittable information amount of non-regular sized color information in a main scanning direction.

The present invention, in another aspect thereof, provides an image communication apparatus that is capable of transmitting and receiving color information. The apparatus includes a device for allowing, in a pre-procedure, a receiver to notify a transmitter as to whether a capability of receiving JPEG-encoded information is provided; a device for allowing, in the pre-procedure, the receiver to notify the transmitter as to whether a capability of receiving full-color information in Lab color space is provided; a device for allowing, in the pre-procedure, the receiver to notify the transmitter as to whether a capability of receiving full-color information in sYCC color space is provided; a device for allowing, in the pre-procedure, the receiver to notify the transmitter as to whether a capability of receiving non-regular-sized information in sYCC color space is provided; a device for allowing, in the pre-procedure, the transmitter to notify the receiver as to designation of transmission of JPEG-encoded information; a device for allowing, in the pre-procedure, the transmitter to notify the receiver as to designation of transmission of full-color information in Lab color space; a device for allowing, in the pre-procedure, the transmitter to notify the receiver as to designation of transmission of full-color information in sYCC color space; a device for allowing, in the pre-procedure, the transmitter to notify the receiver as to designation of transmission of non-regular-sized information in sYCC color space; and a determining device for determining an upper limit of information amount of non-regular-sized information in a main scanning direction based on a maximum receivable sheet size and resolution of full-color information in Lab color space.

The present invention, in another aspect thereof, provides an image communication apparatus that is capable of transmitting and receiving color information. The apparatus includes a device for allowing, in a pre-procedure, a receiver to notify a transmitter as to whether a capability of receiving JPEG-encoded information is provided; a device for allowing, in the pre-procedure, the receiver to notify the transmitter as to whether a capability of receiving full-color information in Lab color space is provided; a device for allowing, in the pre-procedure, the receiver to notify the transmitter as to whether a capability of receiving full-color information in sYCC color space is provided; a device for allowing, in the pre-procedure, the receiver to notify the transmitter as to whether a capability of receiving non-regular-sized information in sYCC color space is provided; a device for allowing, in the pre-procedure, the receiver to notify the transmitter as to a receivable information amount of non-regular-sized information in a main scanning direction in sYCC color space; a device for allowing, in the pre-procedure, the transmitter to notify the receiver as to designation of transmission of JPEG-encoded information; a device for allowing, in the pre-procedure, the transmitter to notify the receiver as to designation of transmission of full-color information in Lab color space; a device for allowing, in the pre-procedure, the transmitter to notify the receiver as to designation of transmission of full-color information in sYCC color space; and a device for allowing, in the pre-procedure, the transmitter to notify the receiver as to designation of transmission of non-regular-sized information in sYCC color space.

The present invention, in another aspect thereof, provides an image communication method that allows transmission and reception of color information. The method includes a step of allowing, in a pre-procedure, a receiver to notify a transmitter as to whether a capability of receiving JPEG-encoded information is provided; a step of allowing, in the pre-procedure, the receiver to notify the transmitter as to whether a capability of receiving full-color information in Lab color space is provided; a step of allowing, in the pre-procedure, the receiver to notify the transmitter as to whether a capability of receiving full-color information in sYCC color space is provided; a step of allowing, in the pre-procedure, the receiver to notify the transmitter as to whether a capability of receiving non-regular-sized information in sYCC color space is provided; a step of allowing, in the pre-procedure, the transmitter to notify the receiver as to designation of transmission of JPEG-encoded information; a step of allowing, in the pre-procedure, the transmitter to notify the receiver as to designation of transmission of full-color information in Lab color space; a step of allowing, in the pre-procedure, the transmitter to notify the receiver as to designation of transmission of full-color information in sYCC color space; a step of allowing, in the pre-procedure, the transmitter to notify the receiver as to designation of transmission of non-regular-sized information in sYCC color space; and a step of determining an upper limit of information amount of non-regular-sized information in a main scanning direction based on a maximum receivable sheet size and resolution of full-color information in Lab color space.

The present invention, in another aspect thereof, provides an image communication method that allows transmission and reception of color information. The method includes a step of allowing, in a pre-procedure, a receiver to notify a transmitter as to whether a capability of receiving JPEG-encoded information is provided; a step of allowing, in the pre-procedure, the receiver to notify the transmitter as to whether a capability of receiving full-color information in Lab color space is provided; a step of allowing, in the pre-procedure, the receiver to notify the transmitter as to whether a capability of receiving full-color information in sYCC color space is provided; a step of allowing, in the pre-procedure, the receiver to notify the transmitter as to whether a capability of receiving non-regular-sized information in sYCC color space is provided; a step of allowing, in the pre-procedure, the receiver to notify the transmitter as to a receivable information amount of non-regular-sized information in a main scanning direction in sYCC color space; a step of allowing, in the pre-procedure, the transmitter to notify the receiver as to designation of transmission of JPEG-encoded information; a step of allowing, in the pre-procedure, the transmitter to notify the receiver as to designation of transmission of full-color information in Lab color space; a step of allowing, in the pre-procedure, the transmitter to notify the receiver as to designation of transmission of full-color information in sYCC color space; and a step of allowing, in the pre-procedure, the transmitter to notify the receiver as to designation of transmission of non-regular-sized information in sYCC color space.

As described above, by determining an upper limit of information amount of non-regular-sized information in a main scanning direction based on a maximum receivable size and resolution received from a receiving end, color information in sYCC color space is transmitted after confirming that color information in any size in sYCC color space can be properly processed at the receiving end. That is, a user is allowed to transmit information captured by a digital camera or information displayed on a personal computer in sYCC color space as it is, and without converting the information amount in the main scanning direction.

Accordingly, the information can be readily transmitted without degrading the quality of the image information.

Furthermore, by newly defining in an ITU-T recommendation that an upper limit of transmittable information amount of non-regular-sized information in the main scanning direction be determined based on a maximum receivable sheet size and resolution of full-color information in sYCC color space, the reliability of transmission is further improved.

Furthermore, sYCC color space can be added to a condition of a maximum receivable sheet size and resolution of full-color information in Lab color space, already defined in ITU-T recommendations. Thus, an upper limit of information amount of non-regular sized information in a main scanning direction can be determined based on these information items.

Furthermore, notification of an actual information amount in the main scanning direction is allowed.

Furthermore, by newly defining in an ITU-T recommendation that a receiver notify a transmitter in a pre-procedure as to a receivable amount of non-regular-sized information in a main scanning direction in sYCC color space, the transmitter is allowed to recognize the receivable amount of non-regular-sized information in the main scanning direction in sYCC color space, and to designate an actual information amount in the main scanning direction in a JPEG file when transmission of non-regular-sized information in sYCC color space is designated. Accordingly, non-regular-sized information in sYCC color space can be reliably transmitted. Since notification of the information amount of non-regular sized information to be transmitted in the main scanning direction in sYCC color space does not take place in the pre-procedure, the need to take a measure in a case where an actual information amount differs from an information amount designated in a JPEG file is eliminated, facilitating control.

Further objects, features and advantages of the present invention will become apparent from the following description of the preferred embodiments (with reference to the attached drawings).

BRIEF DESCRIPTION OF THE DRAWINGS

FIG. 2 is a diagram showing bit information relating to resolution, bit information relating to color, and information to be newly added to ITU-T Recommendation T.30.

DESCRIPTION OF THE PREFERRED EMBODIMENTS

First Embodiment

Figure 1:
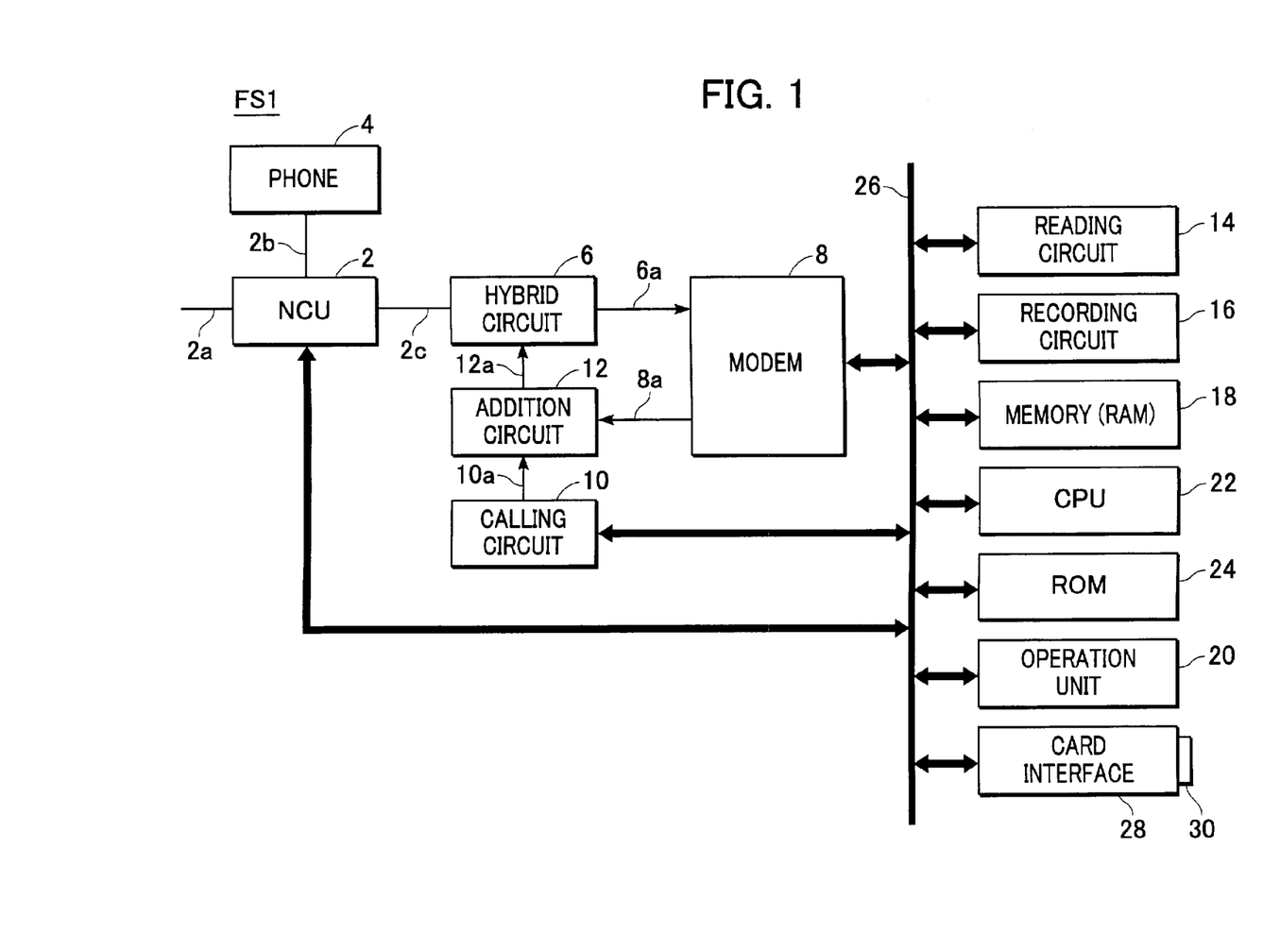
FIG. 1 is a block diagram of a facsimile apparatus to which the present invention can be applied.

FIG. 1 is a block diagram of a facsimile apparatus FS1 according to a first embodiment of the present invention.

Referring to FIG. 1, a network control unit (NCU) 2, in order to use a telephone network for the purpose of data communication or the like, connects to a terminal of the telephone circuit to control connection to the telephone switching network, switches to a data communication path, and maintains a loop. Furthermore, the NCU 2 connects a phone line 2a to a phone (turns off CML (connect modem to line)) or connects the phone line 2a to a facsimile apparatus (turns on CML) as controlled via a bus 26. The phone line 2a is connected to a phone 4 in normal state.

A hybrid circuit 6 separates transmission signals and reception signals so that transmission signals from an adder circuit 12 will be transmitted to the phone line 2a via the NCU 2 and signals from other parties will be received via the NCU 2 and transferred to a modem 8 via a signal line 6a.

The modem 8 modulates and demodulates data based on ITU-T Recommendations V.8, V.21, V.27ter, V.29, V.17, and V.34, and transmission modes are designated as controlled via the bus 26. The modem 8 receives input of a transmission signal from the bus 26 and outputs modulated data to a signal line 8a. The modem 8 also receives input of a reception signal from the signal line 6a and outputs demodulated data to the bus 26.

A calling circuit 10 receives input of a signal representing phone-number information via the bus 26, and outputs a DTMF (dual-tone multi-frequency) selection signal to a signal line 10a.

The adder circuit 12 receives input of information via the signal line 8a and input of information via the signal line 10a, and outputs the result of an addition thereof to a signal line 12a.

A reading circuit 14 is capable of reading color information, and it outputs original-document read data to the bus 26.

A recording circuit 16 is capable of recording color information, and it sequentially records, line by line, information output to the bus 26.

A memory circuit 18 is a work memory, i.e., a random access memory (RAM), and it is used to store raw information or encoded information of data that has been read, and to store received information or decoded information via the bus 26.

An operation unit 20 includes one-touch dialing keys, abbreviated dialing keys, numeric keys, an * key, a # key, a start key, a stop key, a set key, a color-reading key for selecting reading of color information, a file-transmission key for selecting transmission of file information, a transfer key for selecting transfer of received file information to a memory card, and other function keys, and information associated with a key pressed is output to the bus 26.

The operation unit 20 includes a display, to which information output to the bus 26 is input for display.

A central processing unit (CPU) 22 controls the entire facsimile apparatus and executes a facsimile transmission-control procedure according to a control program stored in a read-only memory (ROM) 24.

A card interface 28 allows connection with a memory card 30 (e.g., a compact flash (registered trademark) card storing information captured by a digital camera).

FIG. 2 is a diagram showing bit information relating to resolution, bit information relating to color, and information to be newly added to ITU-T Recommendation T.30.

Bit 15 in an FIF (facsimile information field) of a DIS (digital identification signal)/DTC (digital transmit command) signal represents whether a capability of receiving data at 8 pel/mm×7.7 line/mm or 200×200 dpi is provided. Bit 15 in an FIF of a DCS (digital command signal) signal is used to designate transmission of data at 8 pel/mm×7.7 line/mm or 200 dpi×200 dpi.

Bit 41 in the FIF of the DIS/DTC signal represents whether a capability of receiving data at 8 pel/mm×15.4 line/mm is provided. Bit 41 in the FIF of the DCS signal is used to designate transmission of data at 8 pel/mm×15.4 line/mm.

Bit 42 in the FIF of the DIS/DTC signal represents whether a capability of receiving data at 300 dpi×300 dpi is provided. Bit 42 in the FIF of the DCS signal is used to designate transmission of data at 300 dpi×300 dpi.

Bit 43 in the FIF of the DIS/DTC signal represents whether a capability of receiving data at 16 pel/mm×15.4 line/mm or 400×400 dpi is provided. Bit 43 in the FIF of the DCS signal is used to designate transmission of data at 16 pel/mm×15.4 line/mm or 400 dpi×400 dpi.

Bit 68 in the FIF of the DIS/DTC signal represents whether a capability of receiving JPEG data is provided. Bit 68 in the FIF of the DCS signal is used to designate transmission of JPEG data.

Bit 69 in the FIF of the DIS/DTC signal represents whether a capability of receiving full color data in Lab color space is provided. Bit 69 in the FIF of the DCS signal is used to designate transmission of full color data in Lab color space.

Bit 97 in the FIF of the DIS/DTC signal represents whether a capability of receiving color/grayscale data at 300 dpi×300 dpi or 400 dpi×400 dpi is provided. Bit 97 in the FIF of the DCS signal is used to designate transmission of color/grayscale data at 300 dpi×300 dpi or 400 dpi×400 dpi.

Bit 98 in the FIF of the DIS/DTC signal represents whether a capability of receiving color/grayscale data at 100 dpi×100 dpi is provided. Bit 98 in the FIF of the DCS signal is used to designate transmission of color/grayscale data at 100 dpi×100 dpi.

Bit 110 in the FIF of the DIS/DTC signal represents whether a capability of receiving color/grayscale data at 600 dpi×600 dpi is provided. Bit 110 in the FIF of the DCS signal is used to designate transmission of color/grayscale data at 600 dpi×600 dpi.

Bit 111 in the FIF of the DIS/DTC signal represents whether a capability of receiving color/grayscale data at 1200 dpi×1200 dpi is provided. Bit 111 in the FIF of the DCS signal is used to designate transmission of color/grayscale data at 1200 dpi×1200 dpi.

Bit X in the FIF of the DIS/DTC signal represents whether a capability of receiving full-color data in sYCC color space is provided. Bit X in the FIF of the DCS signal is used to designate transmission of full-color data in sYCC color space.

Bit X+1 in the FIF of the DIS/DTC signal represents whether a capability of receiving non-regular-sized information in sYCC color space is provided. Bit X+1 in the FIF of the DCS signal is used to designate transmission of non-regular-sized information in sYCC color space.

Bits Y to Y+15 in the FIF of the DIS/DTC signal represent a maximum receivable number of pixels in a main scanning direction in sYCC color space. Bits Y to Y+15 in the FIF of the DCS signal are "don't care".

In a facsimile apparatus that is capable of transmitting and receiving color information, the ROM 24 stores a program for executing a pre-procedure. In the pre-procedure, a receiver notifies a transmitter as to whether a capability of receiving JPEG-encoded information is provided, whether a capability of receiving full-color information in Lab color space is provided, whether a capability of receiving full-color information in sYCC color space is provided, and whether a capability of receiving non-regular-sized information in sYCC color space is provided. Furthermore, in the pre-procedure, the transmitter notifies the receiver as to designation of transmission of JPEG-encoded data, designation of transmission of full-color information in Lab color space, designation of transmission of full-color information in sYCC color space, and designation of transmission of non-regular-sized information in sYCC color space.

An upper limit of the information amount of non-regular-sized information in the main scanning information is determined based on a maximum receivable sheet size and resolution of full-color information in Lab color space. When transmission of non-regular-sized information in sYCC color space is designated, an actual amount of information in the main scanning direction is designated in a JPEG file. The ROM 24 stores programs for implementing these functions.

FIGS. 3 to 6 are flowchart showing operations of the first embodiment.

Figure 3:
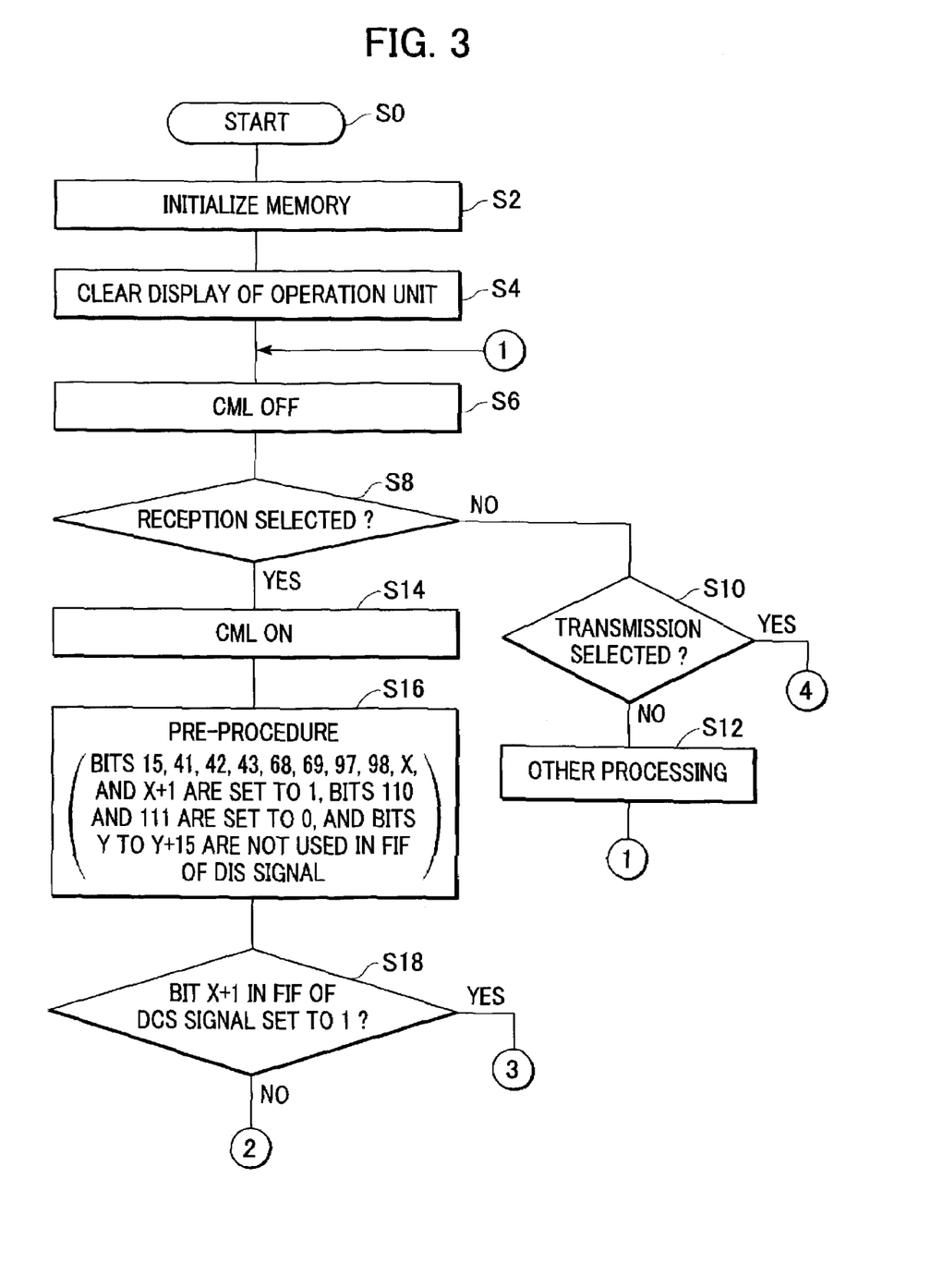
FIG. 3 is a flowchart showing an operation of a first embodiment.

In step S2, the memory 18 is initialized via the bus 26. In step S4, the display of the operation unit 20 is cleared via the bus 26. In step S6, the CML of the NCU 2 is turned off via the bus 26.

In step S8, it is determined whether reception is selected (whether any reception exists). The procedure proceeds to step S14 is reception is selected, while the procedure proceeds to step S10 if reception is not selected.

In step S10, it is determined whether transmission is selected. The procedure proceeds to step S28 if transmission is selected, while the procedure proceeds to step S12 and other processing is executed if transmission is not selected.

In step S14, the CML of the NCU 2 is turned on via the bus 26. In step S16 the pre-procedure is executed, in which bits 15, 41, 42, 43, 68, 69, 97, 98, X, and X+1 are set to 1, bits 110 and 111 are set to 0, and bits Y to Y+15 are not used in an FIF of a DIS signal.

Figure 4:
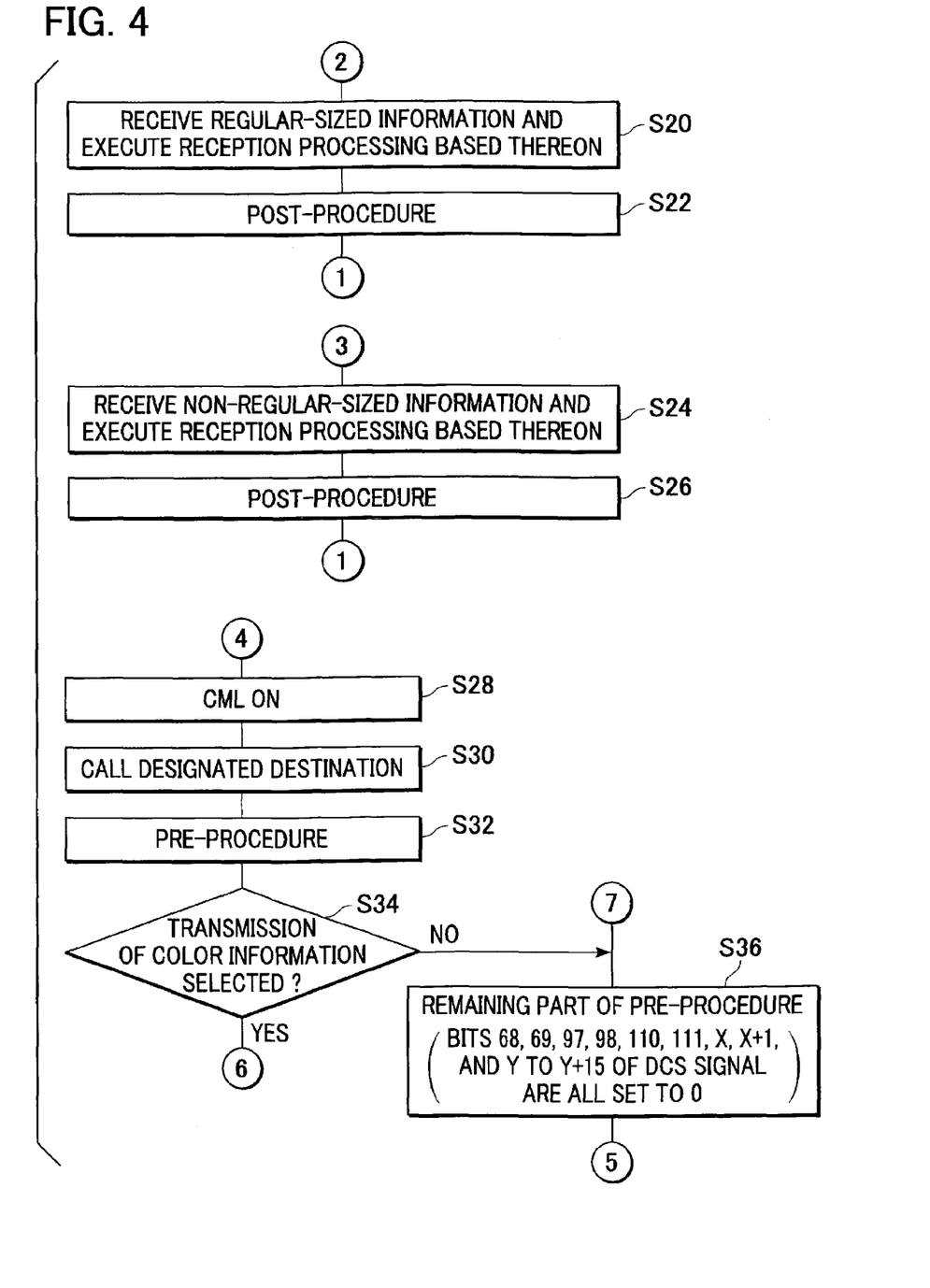
FIG. 4 is a flowchart showing an operation of the first embodiment.

In step S18, it is determined whether bit X+1 in an FIF of a DCS signal is 1. The procedure proceeds to step S24 if bit X+1 in the FIF of the DCS signal is 1, while the procedure proceeds to step S20 if bit X+1 in the FIF of the DCS signal is not 1.

In step S20, since bit X+1 in the FIF of the DCS signal is not 1, regular-sized information is received, and reception processing based on the regular-sized information received is executed. In step S22, a post-procedure is executed. In step S24, since bit X+1 in the FIF of the DCS signal is 1, non-regular-sized information is received, and reception processing based on the non-regular-sized information received is executed. In step S26, the post-procedure is executed.

If it is determined in step S10 that transmission is selected, in step S28, the CML of the NCU 2 is turned on via the bus 26.

In step S30, a designated destination is called by the calling circuit 10. In step S32, the pre-procedure is executed.

Figure 5:
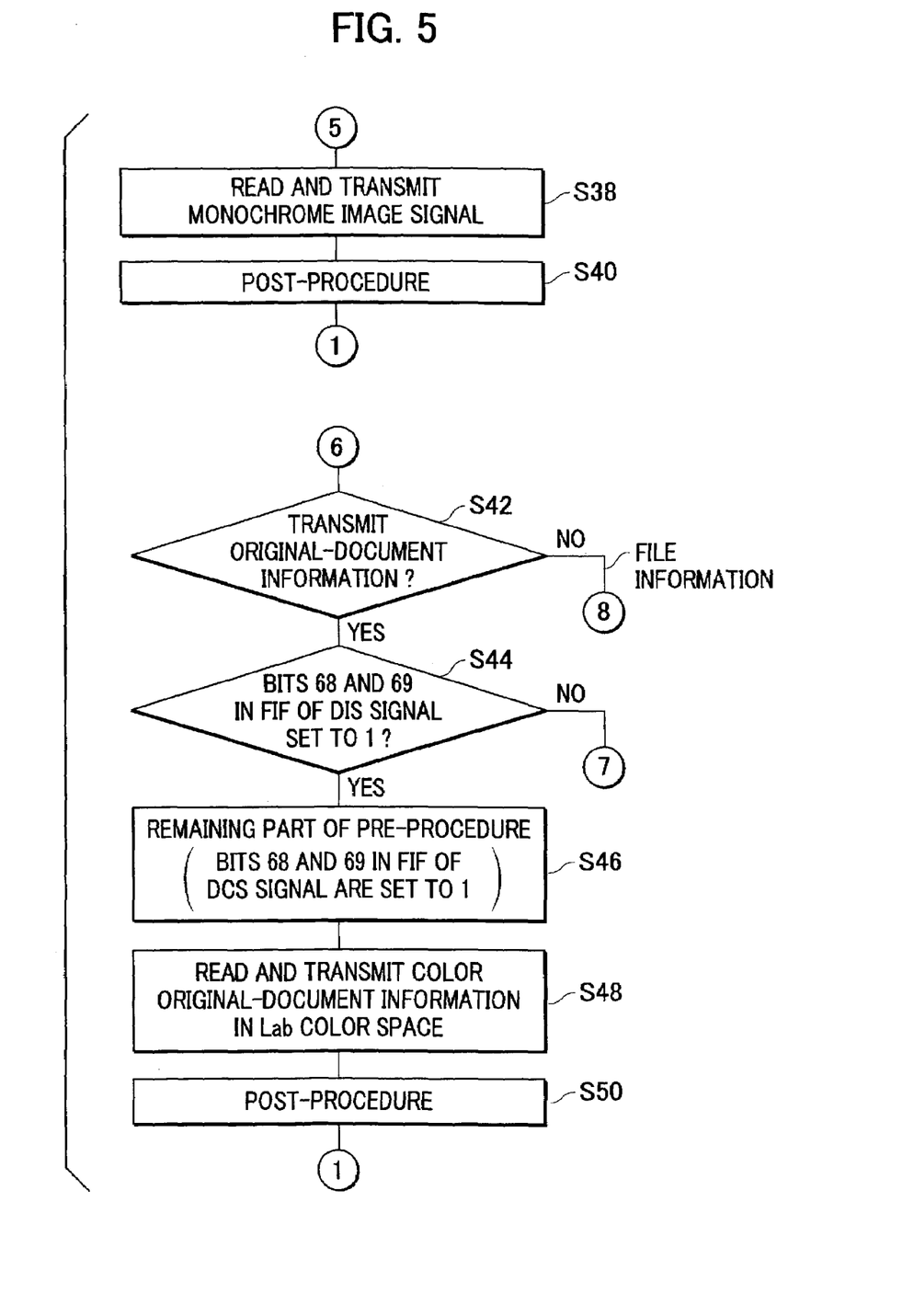
FIG. 5 is a flowchart showing an operation of the first embodiment.

In step S34, it is determined whether transmission of color information is selected. The procedure proceeds to step S42 if transmission of color information is selected, while the procedure proceeds to step S36 if transmission of color information is not selected.

If transmission of color information is not selected, that is, if transmission of monochrome information is selected, the remaining part of the pre-procedure is executed, in which bits 68, 69, 97, 98, 110, 111, X, X+1, and Y to Y+15 are all set to 0.

In step S38, a monochrome image signal is read and transmitted. In step S40, the post-procedure is executed.

If transmission of color information is selected, in step S42, it is determined whether transmission of original-document information is selected. The procedure proceeds to step S44 if transmission of original-document information is selected, while the procedure proceeds to step S52 if transmission of original-document information is not selected.

In step S44, it is determined whether bits 68 and 69 in the FIF of the DIS signal are both 1. The procedure proceeds to step S46 if bits 68 and 69 in the FIF of the DIS signal are both 1, while the procedure proceeds to step S36 if bits 68 and 69 in the FIF of the DIS signal are not both 1.

If a capability of receiving JPEG data and a capability of receiving full-color data in Lab color space are provided, the remaining part of the pre-procedure in executed in step S46, in which bits 68 and 69 in the FIF of the DCS signal are set to 1.

In step S48, color original-document information in Lab color space is read and transmitted. In step S50, the post-procedure is executed.

Figure 6:
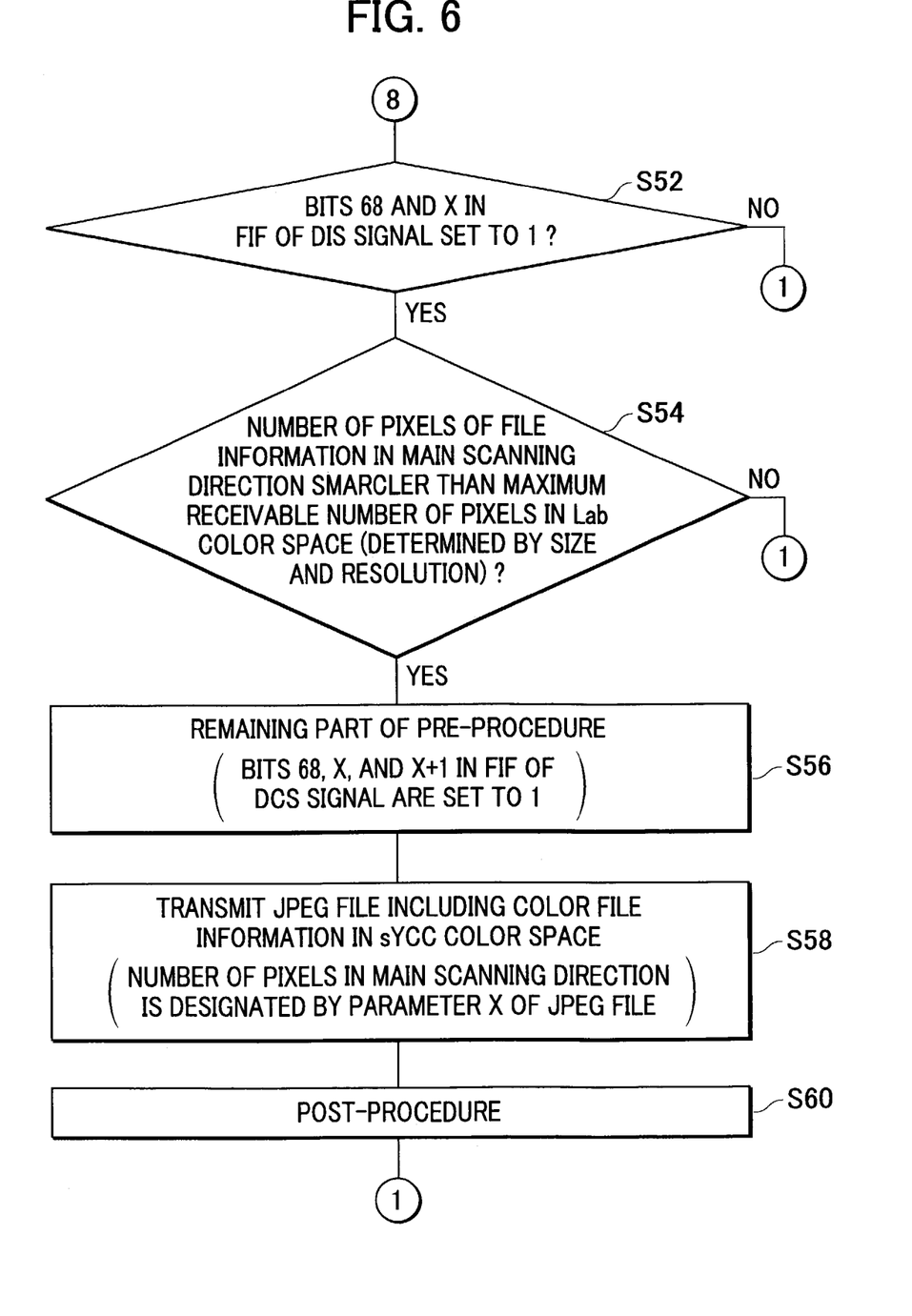
FIG. 6 is a flowchart showing an operation of the first embodiment.

If transmission of file information is selected, in step S52, it is determined whether bits 68 and X in the FIF of the DIS signal are both 1. The procedure proceeds to step S54 if bits 68 and X in the FIF of the DIS signal both are 1, while the procedure proceeds to step S6 if bits 68 and X in the FIF of the DIS signal are not both 1.

If a capability of receiving JPEG data and a capability of receiving full-color data in sYCC color space are provided, in step S54, it is determined whether a number of pixels of the file information in the main scanning direction is smaller than a maximum receivable number of pixels in Lab color space. The procedure proceeds to step S56 if the number of pixels is smaller than the maximum receivable number of pixels in Lab color space, while transmission does not take place and the procedure proceeds to step S6 if the number of pixels is not smaller than the maximum receivable number of pixels in Lab color space. The maximum receivable number of pixels in Lab color space is determined based on a receivable size (A4 in this example) and a resolution.

In step S56, the remaining part of the pre-procedure is executed, in which bits 68, X, and X+1 in the FIF of the DCS signal are set to 1, whereby transmission of full-color JPEG data in sYCC color space is designated.

In step S58, a JPEG file including color file information in sYCC color space is transmitted. In step S60, the post-procedure is executed. The color file information is, for example, a JPEG image stored in a compact flash card inserted in a card slot of the facsimile apparatus.

Second Embodiment

A second embodiment of the present invention differs from the first embodiment in that an upper limit of the information amount of non-regular-sized information in the main scanning direction is determined based on a maximum receivable sheet size and resolution of full-color information in sYCC color space.

Figure 7:
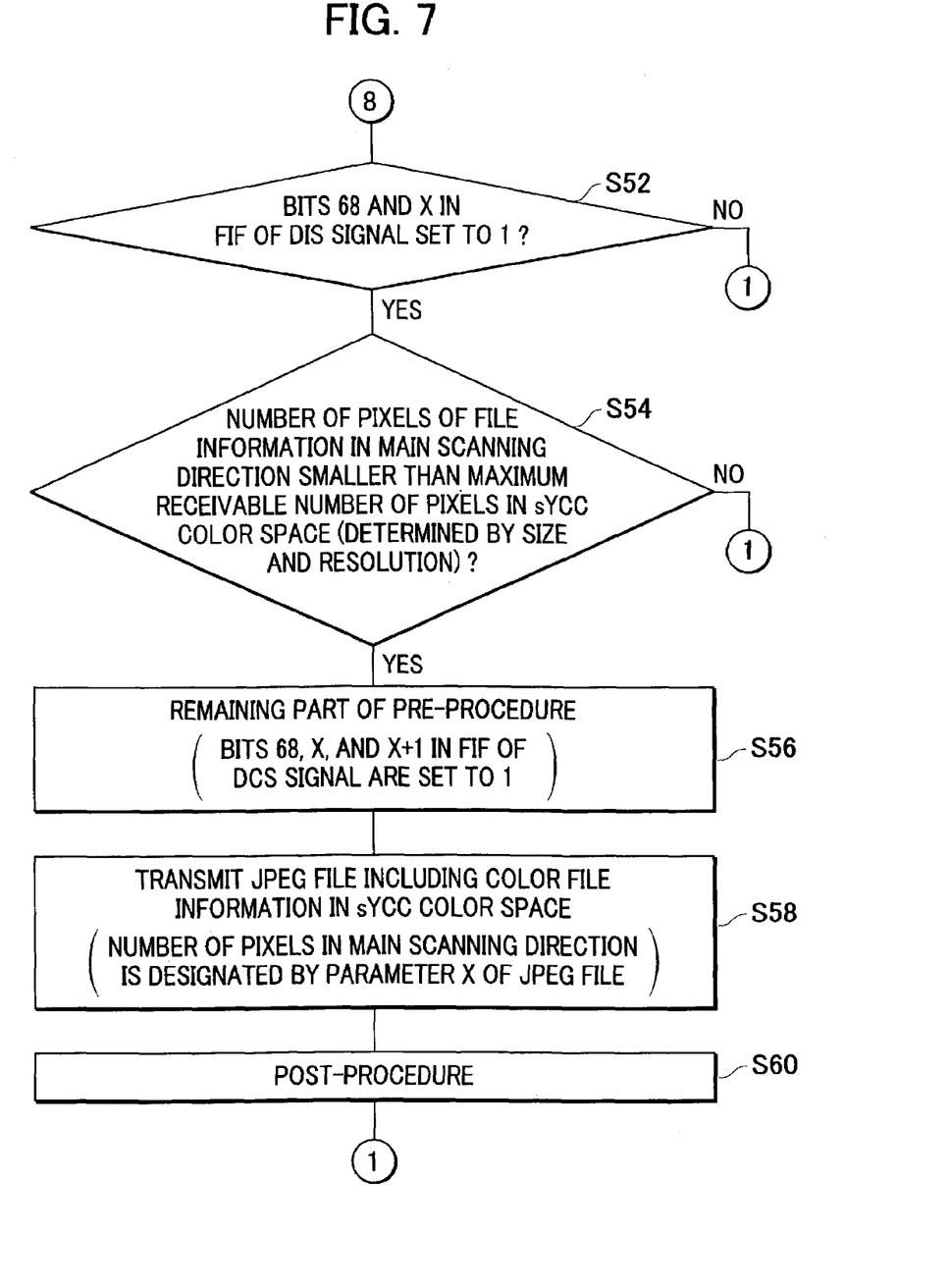
FIG. 7 is a flowchart showing a part of an operation of a second embodiment that differs from that of the first embodiment.

FIG. 7 is a flowchart showing a part of operation of the second embodiment that differs from that of the first embodiment.

The operation of the second embodiment is basically the same as that shown in FIGS. 3 to 6, but step S54 shown in FIG. 7 differs from that shown in FIG. 6.

More specifically, in the second embodiment, as shown in FIG. 7, sYCC color space is used in step S54, as opposed to Lab color space used in the first embodiment.

Furthermore, in the second embodiment, bits 97, 98, 110, and 111 shown in FIG. 2 relate to Lab color space. Furthermore, bits Z, Z+1, Z+2, and Z+3 may be defined for sYCC color space similarly to bits 97, 98, 110, and 111.

Third Embodiment

A third embodiment of the present invention differs from the first embodiment in that an upper limit of the information amount of non-regular-sized information in the main scanning direction is determined based on a maximum receivable sheet size and resolution of full-color information in Lab color space or full-color information in sYCC color space.

Figure 8:
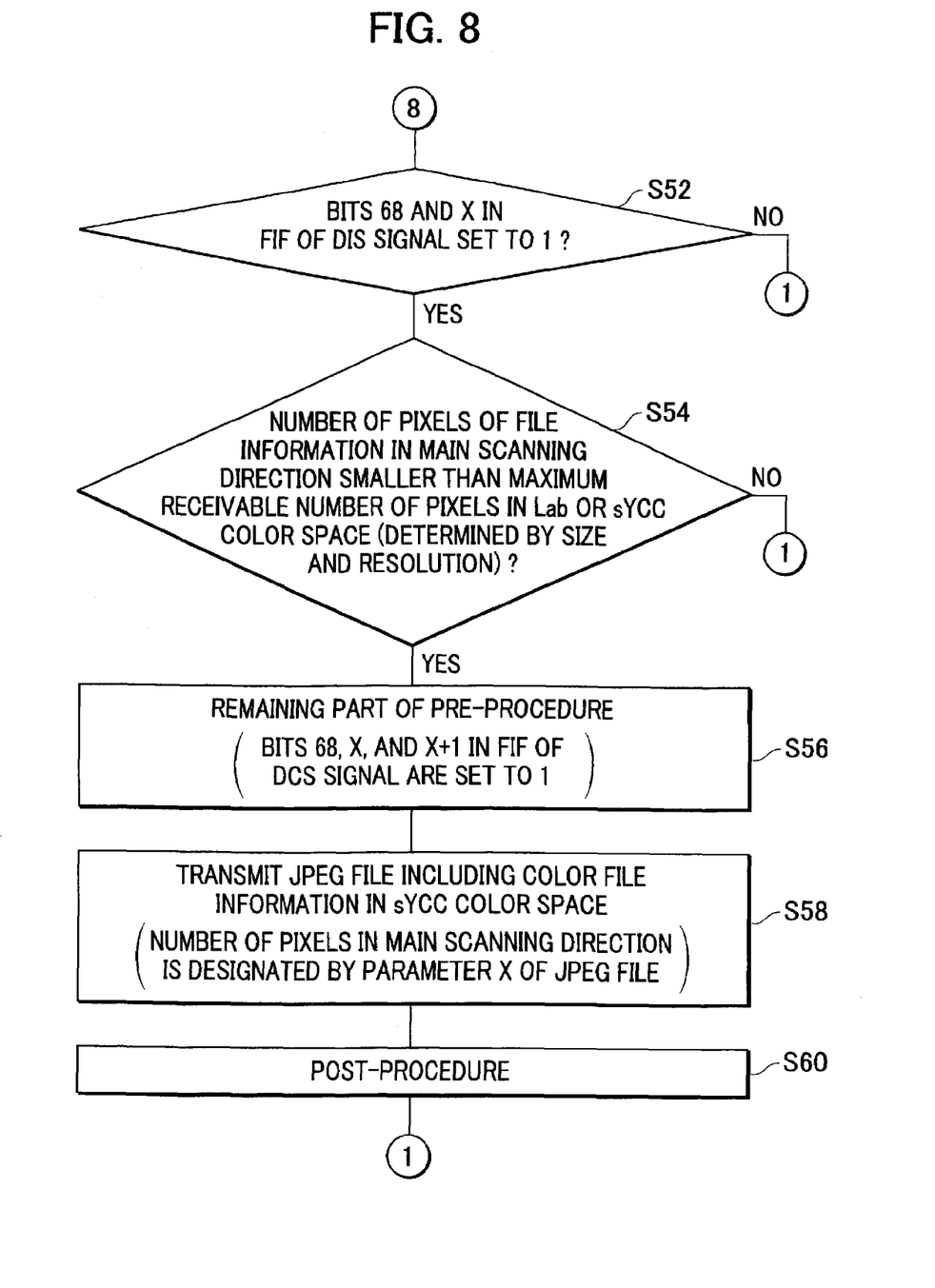
FIG. 8 is a flowchart showing a part of an operation of a third embodiment that differs from that of the first embodiment.

FIG. 8 is a flowchart showing a part of operation of the third embodiment that differs from that of the first embodiment.

The operation of the third embodiment is basically the same as that shown in FIGS. 3 to 6, but step S54 shown in FIG. 8 differs from that shown in FIG. 6.

More specifically, according to the third embodiment, as shown in FIG. 8 Lab or sYCC color space is used in step S54, as opposed to Lab color space used in the first embodiment.

Furthermore, in the third embodiment, bits 97, 98, 110, and 111 shown in FIG. 2 are defined for Lab color space and sYCC color space.

Fourth Embodiment

According to a fourth embodiment of the present invention, in a facsimile apparatus that is capable of transmitting and receiving color information, the ROM 24 stores a program for executing a pre-procedure. In the pre-procedure, a receiver notifies a transmitter as to whether a capability of receiving JPEG-encoded information is provided, whether a capability of receiving full-color information in Lab color space is provided, whether a capability of receiving full-color information in sYCC color space is provided, whether a capability of receiving non-regular-sized information in sYCC color space is provided, and an information amount of receivable non-regular-sized information in a main scanning direction in sYCC color space. Furthermore, in the pre-procedure, the transmitter notifies the receiver as to designation of transmission of JPEG-encoded data, designation of transmission of full-color information in Lab color space, designation of transmission of full-color information in sYCC color space, and designation of transmission of non-regular-sized information in sYCC color space.

Figure 9:
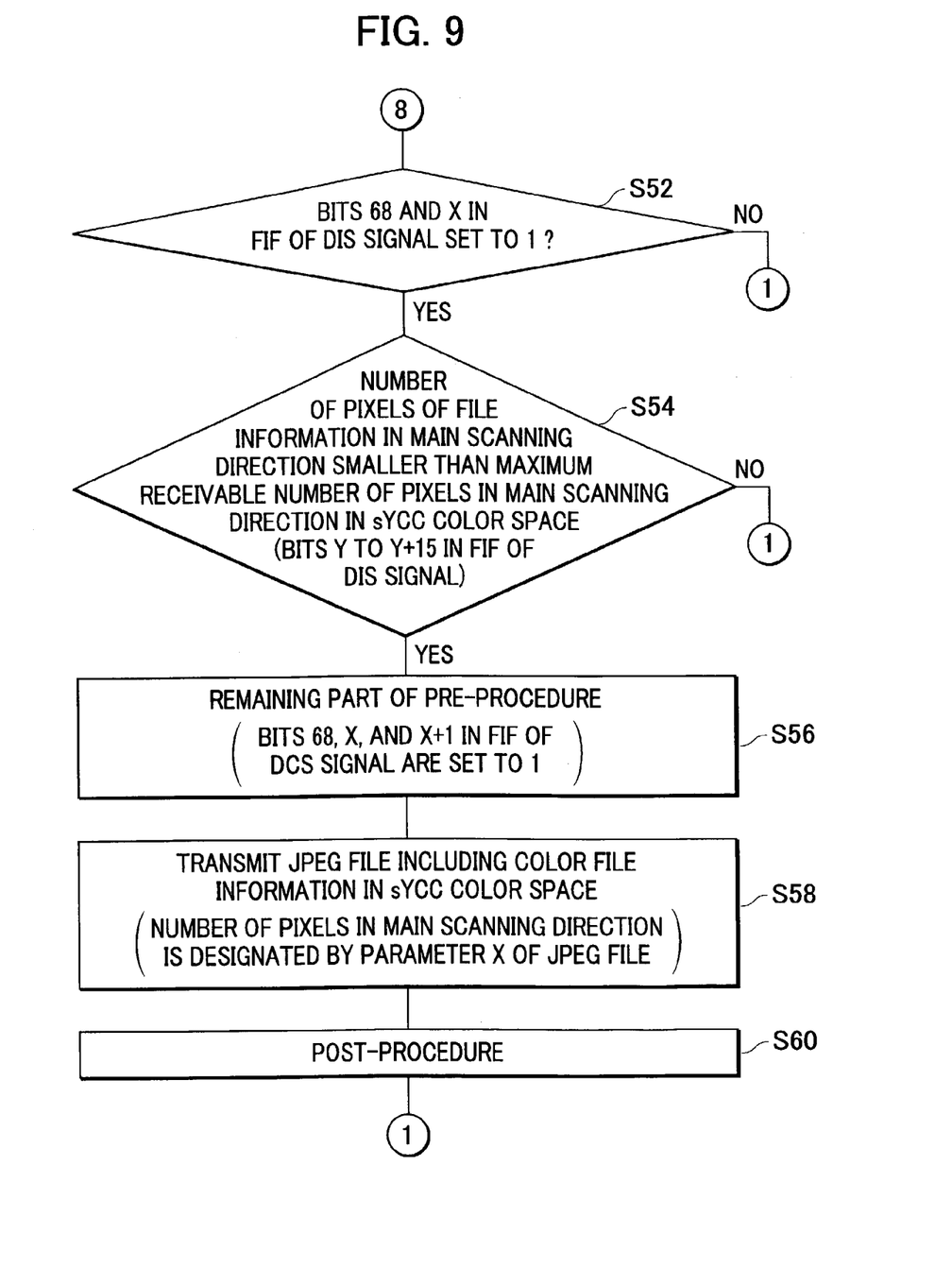
FIG. 9 is a flowchart showing a part of an operation of a fourth embodiment that differs from that of the first embodiment.

FIG. 9 is a flowchart showing a part of operation of the fourth embodiment that differs from that of the first embodiment.

The operation of the fourth embodiment is basically the same as that show in FIGS. 3 to 6, but step S54 shown in FIG. 9 differs from that shown in FIG. 6.

More specifically, in the fourth embodiment, in step S54, it is determined whether a number of pixels of file information in the main scanning direction is smaller than a maximum receivable number of pixels in the main scanning direction in sYCC color space (bits Y to Y+15 in an FIF of a DIS signal), as opposed to step S54 in the first embodiment.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of controlling a color-image communication apparatus, comprising:
 a receiving step of receiving information representing a maximum receivable size and-resolution of color information from an apparatus at a receiving end;
 an obtaining step of obtaining a number of pixels, in a main scanning direction, of image information to be transmitted;
 a comparing step of comparing a maximum number of pixels in the main scanning direction, determined by the maximum receivable size and resolution received in the receiving step, with the number of pixels in the main scanning direction, obtained in the obtaining step; and
 a transmission-control step of not transmitting the image information when the number of pixels in the main scanning direction, obtained in the obtaining step, is larger than the maximum number of pixels in the main scanning direction, determined by the maximum receivable size and resolution received in the receiving step, while transmitting the image information when the number of pixels in the main scanning direction, obtained in the obtaining step, is not larger than the maximum number of pixels in the main scanning direction, determined by the maximum receivable size and resolution received in the receiving step;
 wherein a number of pixels in a main scanning direction of a JPEG (Joint Photographic Experts Group) image stored in a storage medium is obtained in the obtaining step; and
 wherein the JPEG image stored in the storage medium is a full-color image in sYCC color space.

2. A method of controlling a color-image communication apparatus, comprising:
 a receiving step of receiving information representing a maximum receivable size and resolution of color information from an apparatus at a receiving end;
 a designating step of designating transmission of non-regular-sized color information; and
 a determining step of determining an upper limit of transmittable information amount of non-regular-sized color information in a main scanning direction;
 wherein the color information is a JPEG file in sYCC color space, stored in a storage medium.

3. An image communication apparatus that is capable of transmitting and receiving color information, comprising:
 means for allowing, in a pre-procedure, a receiver to notify a transmitter as to whether a capability of receiving JPEG-encoded information is provided;
 means for allowing, in the pre-procedure, the receiver to notify the transmitter as to whether a capability of receiving full-color information in Lab color space is provided;
 means for allowing, in the pre-procedure, the receiver to notify the transmitter as to whether a capability of receiving full-color information in sYCC color space is provided;
 means for allowing, in the pre-procedure, the receiver to notify the transmitter as to whether a capability of receiving non-regular-sized information in sYCC color space is provided;
 means for allowing, in the pre-procedure, the transmitter to notify the receiver as to designation of transmission of JPEG-encoded information;
 means for allowing, in the pre-procedure, the transmitter to notify the receiver as to designation of transmission of full-color information in Lab color space;
 means for allowing, in the pre-procedure, the transmitter to notify the receiver as to designation of transmission of full-color information in sYCC color space;
 means for allowing, in the pre-procedure, the transmitter to notify the receiver as to designation of transmission of non-regular-sized information in sYCC color space; and
 determining means for determining an upper limit of information amount of non-regular-sized information in a main scanning direction based on a maximum receivable sheet size and resolution of full-color information in Lab color space.

4. An image communication apparatus that is capable of transmitting and receiving color information, comprising:
 means for allowing, in a pre-procedure, a receiver to notify a transmitter as to whether a capability of receiving JPEG-encoded information is provided;
 means for allowing, in the pre-procedure, the receiver to notify the transmitter as to Whether a capability of receiving-full-color information in Lab color space is provided;
 means for allowing, in the pre-procedure, the receiver to notify the transmitter as to whether a capability of receiving full-color information in sYCC color space is provided;
 means for allowing, in the pre-procedure, the receiver to notify the transmitter as to whether a capability of receiving non-regular-sized information in sYCC color space is provided;
 means for allowing, in the pre-procedure, the receiver to notify the transmitter as to a receivable information amount of non-regular-sized information in a main scanning direction in sYCC color space;
 means for allowing, in the pre-procedure, the transmitter to notify the receiver as to designation of transmission of JPEG-encoded information;
 means for allowing, in the pre-procedure, the transmitter to notify the receiver as to designation of transmission of full-color information in Lab color space;
 means for allowing, in the pre-procedure, the transmitter to notify the receiver as to designation of transmission of full-color information in sYCC color space; and
 means for allowing, in the pre-procedure, the transmitter to notify the receiver as to designation of transmission of non-regular-sized information in sYCC color space.

5. An image communication method that-allows transmission and reception of color information, comprising:

a step of allowing, in a pre-procedure, a receiver to notify a transmitter as to whether a capability of receiving JPEG-encoded information is provided;

a step of allowing, in the pre-procedure, the receiver to notify the transmitter as to whether a capability of receiving full-color information in Lab color space is provided;

a step of allowing, in the pre-procedure, the receiver to notify the transmitter as to whether a capability of receiving full-color information in sYCC color space is provided;

a step of allowing, in the pre-procedure, the receiver to notify the transmitter as to whether a capability of receiving non-regular-sized information in sYCC color space is provided;

a step of allowing, in the pre-procedure, the transmitter to notify the receiver as to designation of transmission of JPEG-encoded information;

a step of allowing, in the pre-procedure, the transmitter to notify the receiver as to designation of transmission of full-color information in Lab color space;

a step of allowing, in the pre-procedure, the transmitter to notify the receiver as to designation of transmission of full-color information in sYCC color space;

a step of allowing, in the pre-procedure, the transmitter to notify the receiver as to designation of transmission of non-regular-sized information in sYCC color space; and a step of determining upper limit of information amount of non-regular-sized information in a main scanning direction based on a maximum receivable sheet size and resolution of full-color information in Lab color space.

6. An image communication method that allows transmission and reception of color information, comprising:

a step of allowing, in a pre-procedure, a receiver to notify a transmitter as to whether a capability of receiving JPEG-encoded information is provided;

a step of allowing, in the pre-procedure, the receiver to notify the transmitter as to whether a capability of receiving full-color information in Lab color space is provided;

a step of allowing, in the pre-procedure, the receiver to notify the transmitter as to whether a capability of receiving full-color information in sYCC color space is provided;

a step of allowing, in the pre-procedure, the receiver to notify the transmitter as to whether a capability of receiving non-regular-sized information in sYCC color space is provided;

a step of allowing, in the pre-procedure, the receiver to notify the transmitter as to a receivable information amount of non-regular-sized information in a main scanning direction in sYCC color space;

a step of allowing, in the pre-procedure, the transmitter to notify the receiver as to designation of transmission of JPEG-encoded information;

a step of allowing, in the pre-procedure, the transmitter to notify the receiver as to designation of transmission of full-color information in Lab color space;

a step of allowing, in the pre-procedure, the transmitter to notify the receiver as to designation of transmission of full-color information in sYCC color space; and a step of allowing, in the pre-procedure, the transmitter to notify the receiver as to designation of transmission of non-regular-sized information in sYCC color space.

* * * * *

UNITED STATES PATENT AND TRADEMARK OFFICE
CERTIFICATE OF CORRECTION

| | | |
|---|---|---|
| PATENT NO. | : 7,277,197 B2 | Page 1 of 1 |
| APPLICATION NO. | : 10/347377 | |
| DATED | : October 2, 2007 | |
| INVENTOR(S) | : Takehiro Yoshida | |

It is certified that error appears in the above-identified patent and that said Letters Patent is hereby corrected as shown below:

In the Drawings:
SHEET 6

Figure 6, "SMARCLER" should read --SMALLER--.

COLUMN 8

Line 26, "flowchart" should read --flowcharts--.

COLUMN 11

Line 20, "and-resolution" should read --and resolution--.

COLUMN 12

Line 39, "Whether" should read --whether--.

Signed and Sealed this

Ninth Day of September, 2008

JON W. DUDAS
*Director of the United States Patent and Trademark Office*